Nov. 15, 1927.  
E. E. NEWBY  
1,648,959  
FLUID TANK INDICATOR  
Filed Sept. 21, 1925

Inventor  
Edward E. Newby  
By L. B. James, Attorney

Patented Nov. 15, 1927.

1,648,959

UNITED STATES PATENT OFFICE.

EDWARD E. NEWBY, OF INDIANAPOLIS, INDIANA.

FLUID-TANK INDICATOR.

Application filed September 21, 1925. Serial No. 57,632.

This invention relates to fluid storage tanks and more particularly to automobile fuel tanks.

The primary object of this invention resides in the provision of a fluid storage tank, particularly an automobile fuel tank, adapted to carry a concealed capacity gauge in convenient access to the driver of an automobile for determining the amount of fuel placed into the tank at supply stations.

Another object of this invention resides in the provision of a fluid storage tank, particularly an automobile fuel tank adapted to carry a capacity gauge in protected position for convenient access to be observed while the tank is being filled.

A further object of this invention resides in the provision of a fluid storage tank, particularly an automobile fuel tank, consisting of a capacity gauge disposed for convenient removal from the tank.

A still further object of this invention resides in the provision of a fluid storage tank consisting of a capacity gauge having a valved inlet adapted to be opened to drain the tank, and closed to prevent the flow of the fuel from the tank.

In addition to the aforesaid objects, this invention resides in the provision of a fluid storage tank having a fluid column provided with a by-pass remote from which is a vent to permit the fluid to readily elevate in the column in front of a graduated dial adapted to indicate the amount of fluid in the tank.

Among the foregoing objects of this invention provision is made whereby the contents of the tank or column can be drawn for other purposes.

With these and other objects in view, this invention resides in certain novel features of construction and arrangement of elements to be hereinafter set forth in the specification, illustrated in the accompanying drawing and pointed out in the appended claim and, while the disclosure depicts my present conception of the invention, the right is reserved to resort to such changes in construction as come within the scope of the claim.

In the accompanying drawing forming a part of this application:

Figure 1:
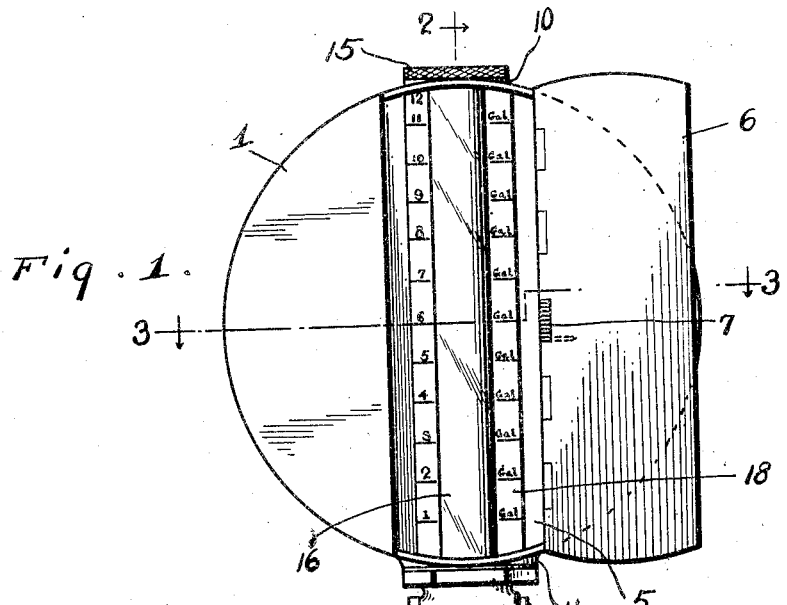
Fig. 1 is an end view of a fluid tank showing the elements of this invention associated therewith and the door in open position.
Figure 2:
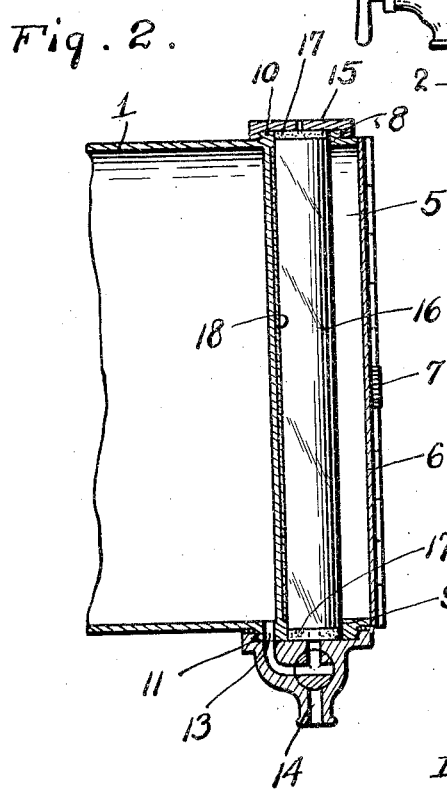
Fig. 2 is a vertical sectional view on line 2—2 of Fig. 1.
Figure 3:
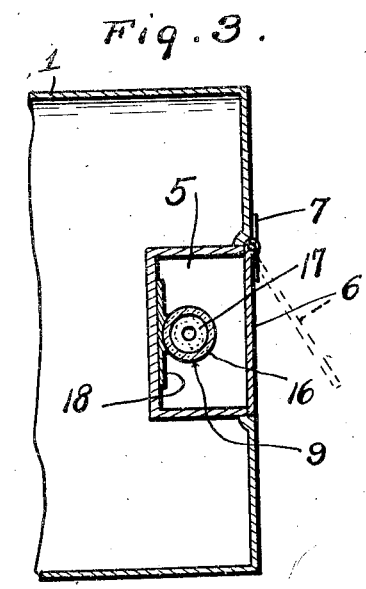
Fig. 3 is a horizontal sectional view on line 3—3 of Fig. 1.

In the present embodiment of this invention a fluid tank 1 is illustrated as being round in configuration but, as the shape of the tank does not affect the operation of the elements comprising this invention, any type of tank can be utilized by modifying it to accommodate the elements forming the subject matter of this application.

Preferably formed in the tank is a compartment 5 provided with a hinged door 6 which is held in closed position by a spring 7 or other suitable element.

The aforesaid compartment extends from the bottom to the top of the tank and is provided with aligned apertures 8 and 9 formed in exteriorly threaded bosses 10 and 11, the latter of which is provided with a port 13 in communication with the tank.

Threadedly carried by the boss 11 is a valve 14 adapted to control the flow of the contents of the tank therefrom.

Disposed in the aligned apertures of the compartment, in communication with the valve 14 and a vent cap 15 remote therefrom, is a transparent column 16, the same being sealed against leakage at its ends by suitable gaskets 17.

Carried in close proximity to the fluid column is a graduated dial 18 adapted to readily indicate the capacity of the tank as the level of the fluid therein elevates in the column.

Through the instrumentality of this embodiment of elements, particularly the association of the column with the valved inlet from the tank, the contents of the tank can be either directed to the column or exterior of the tank, including provision for closing the port from the tank while draining the column.

With this invention fully described, it is manifest that a tank having an accurate capacity gauge is provided and, through the particular association of elements, safety against damage is not only provided for but provision is made for preventing the waste of the contents of the tank should the column become broken.

Having thus fully described my invention, what I claim and desire to protect by Letters Patent is:

The combination with a fluid storage tank having a compartment disposed inwardly of one end, upper and lower, exteriorly threaded bosses having aligned apertures disposed on a plane passing through the compartment, the lower boss having a port communicating with the interior of the tank, a transparent tube seated in the apertures of the bosses, apertured gaskets disposed against the ends of the tube, a valve casing screwed on the lower boss against the adjacent gasket of the tube, said valve casing having a passage connecting the tube to the tank and exterior of the casing, a two-way valve in the valve casing, a vented cap threaded on the upper boss against the adjacent gasket of the tube, a graduated dial disposed between the tube and inner wall of the compartment and a door seated inwardly of the outer surface of the tank and closing the compartment.

In testimony whereof I affix my signature.

EDWARD E. NEWBY.